(12) United States Patent
Bellamy et al.

(10) Patent No.: US 10,448,573 B1
(45) Date of Patent: Oct. 22, 2019

(54) BASKET RAKE

(71) Applicant: Rankin Equipment Co., Union Gap, WA (US)

(72) Inventors: Teddy W. Bellamy, Union Gap, WA (US); Marc L. Harris, Union Gap, WA (US)

(73) Assignee: Rankin Equipment Co., Union Gap, WA (US)

( * ) Notice: Subject to any disclaimer, the term of this patent is extended or adjusted under 35 U.S.C. 154(b) by 0 days.

(21) Appl. No.: 15/250,526

(22) Filed: Aug. 29, 2016

Related U.S. Application Data (60) Provisional application No. 62/211,608, filed on Aug. 28, 2015.

(51) Int. Cl.
*A01D 69/03* (2006.01)
*A01D 78/00* (2006.01)
*A01D 80/02* (2006.01)

(52) U.S. Cl.
CPC ........... *A01D 69/03* (2013.01); *A01D 78/001* (2013.01); *A01D 80/02* (2013.01)

(58) Field of Classification Search
CPC ... A01D 78/00–20; A01D 69/03; A01D 80/02
See application file for complete search history.

(56) References Cited

U.S. PATENT DOCUMENTS

| | | | | |
|---|---|---|---|---|
| 3,284,036 A | * | 11/1966 | Nansel | B66C 13/12 191/12 C |
| 3,330,105 A | * | 7/1967 | Weber | B23Q 1/0009 138/120 |
| 3,568,423 A | * | 3/1971 | Hale | A01D 67/005 56/377 |
| 3,914,928 A | * | 10/1975 | Weaver | A01D 78/04 56/15.6 |
| 4,166,353 A | * | 9/1979 | Garrison | A01D 78/04 56/377 |
| 4,245,458 A | * | 1/1981 | Smith | A01D 78/001 172/314 |

(Continued)

OTHER PUBLICATIONS

Twinstar Generation 2 Basket Rake, Model 2027-G2 / Model 2030-G2, Operator's Manual, 46 pages, Sep. 2012.

*Primary Examiner* — Robert E Pezzuto
*Assistant Examiner* — Adam J Behrens
(74) *Attorney, Agent, or Firm* — Polsinelli PC; Emily C. Peyser (57) ABSTRACT

A basket rake includes a main frame configured to be coupled to a tractor, a left basket coupled to the main frame via a left extension frame, a right basket coupled to the main frame via a right extension frame, a plurality of hydraulic actuators, a plurality of control lines, and a multi-function valve. Each of the plurality of control lines is hydraulically coupled to one of the plurality of actuators. The multi-function valve is hydraulically coupled to each of the plurality of control lines and is configured to receive hydraulic fluid from the tractor and control flow of hydraulic fluid independently to each of the plurality of hydraulic actuators via the plurality of control lines to extend or retract the extension frames, rotate the left or right baskets, raise or lower the left or right baskets, and operate drive motors of the left and right baskets.

15 Claims, 11 Drawing Sheets

(56) References Cited

U.S. PATENT DOCUMENTS

| | | | | |
|---|---|---|---|---|
| 4,343,142 A * | 8/1982 | Allen | ............... | A01D 67/00 56/11.9 |
| 4,723,402 A * | 2/1988 | Webster | ............... | A01D 78/146 56/15.5 |
| 4,723,403 A * | 2/1988 | Webster | ............... | A01D 78/146 56/181 |
| 6,539,696 B2 * | 4/2003 | Blakeslee | ............... | A01D 78/005 56/375 |
| 7,328,567 B2 * | 2/2008 | Kappel | ............... | A01D 78/146 56/375 |
| 2005/0055995 A1 * | 3/2005 | Kappel | ............... | A01D 78/146 56/375 |
| 2015/0020492 A1 * | 1/2015 | Schwer | ............... | A01B 63/24 56/377 |
| 2015/0053446 A1 * | 2/2015 | Kovach | ............... | A01B 51/00 172/776 |
| 2016/0338259 A1 * | 11/2016 | Schwer | ............... | A01B 63/24 |

* cited by examiner

BASKET RAKE

CROSS-REFERENCE TO RELATED APPLICATION

The present application claims the benefit of U.S. Provisional No. 62/211,608, filed Aug. 28, 2015, the disclosure of which is hereby expressly incorporated by reference herein in its entirety.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure is generally directed to embodiments of basket rakes usable as tractor implements to harvest hay and other agricultural products. Basket rakes typically include baskets into which rotating rake tines direct hay or any other agricultural product while being pulled by a tractor. The baskets collect the hay which can be baled either in the basket or later off the basket.

In accordance with one embodiment of the present disclosure, a basket rake is provided. The basket rake includes: a main frame configured to be coupled to a tractor; a left basket including a drive motor, the left basket coupled to the main frame via a left extension frame; a right basket including a drive motor, the right basket coupled to the main frame via a right extension frame; and a plurality of hydraulic actuators; a plurality of control lines, wherein each of the plurality of control lines is hydraulically coupled to one of the plurality of actuators; a multi-function valve hydraulically coupled to each of the plurality of control lines, wherein the multi-function valve is configured to receive hydraulic fluid from the tractor and further configured to control flow of hydraulic fluid independently to each of the plurality of hydraulic actuators via the plurality of control lines such that the plurality of hydraulic actuators are independently controlled to: extend or retract the left extension frame, extend or retract the right extension frame, rotate the left basket, rotate the right basket, raise or lower the left basket, raise or lower the right basket, and operate the drive motors of the left and right baskets.

In accordance with another embodiment of the present disclosure, a method of operating a basket rake is provided, wherein the basket rake includes a main frame configured to be coupled to a tractor, a left basket coupled to the main frame via a left extension frame, and a right basket coupled to the main frame via a right extension frame. The method includes: receiving, by a multi-function valve, a flow of hydraulic fluid from a tractor; receiving, by the multi-function valve, one or more control signals from a control box; and controlling, by the multi-function valve based on the one or more control signals, flow of hydraulic fluid independently to each a plurality of control lines hydraulically coupled between the multi-function valve and one of a plurality of actuators on the basket rake such that the plurality of hydraulic actuators are independently controlled to: extend or retract the left extension frame, extend or retract the right extension frame, rotate the left basket, rotate the right basket, raise or lower the left basket, raise or lower the right basket, and operate drive motors of the left and right baskets.

In any of the embodiment described herein, the multi-function valve may be configured to limit a flow rate of hydraulic fluid to each of the plurality of control lines based on a predetermined limit for each of the plurality of control lines.

In any of the embodiment described herein, the multi-function valve may include a plurality of solenoid valves configured to control flow of hydraulic fluid independently to each of the plurality of control lines.

In any of the embodiment described herein, the multi-function valve may be configured to receive a control signal, wherein the plurality of solenoid valves are configured to be actuated based on the control signal.

In any of the embodiment described herein, the multi-function valve may be configured to receive the control signal from a control box configured to receive user inputs.

In any of the embodiment described herein, the basket rake may further include a hose track configured to reduce a likelihood of damage to at least one of the plurality of control lines that extends between the multi-function valve and at least one of the plurality of actuators on the right basket during extension or retraction of the left extension frame.

In any of the embodiment described herein, the at least one of the plurality of control lines may include a releasable fitting located within a particular distance of an end of the hose track.

In any of the embodiment described herein, the right basket may be coupled to an end of the right extension frame via a double shear angle mount.

In any of the embodiment described herein, a vertical bracket may be fixedly coupled to the end of the right extension frame, and the right basket may be coupled to the vertical bracket via the double shear angle mount.

In any of the embodiment described herein, the basket rake may further include at least one gauge wheel located at an end of the right basket.

In any of the embodiment described herein, the gauge wheel may be a torsion axle suspension gauge wheel.

In any of the embodiment described herein, a method of use may further include limiting, by the multi-function valve, a flow rate of hydraulic fluid to each of the plurality of control lines based on a predetermined limit for each of the plurality of control lines.

In any of the embodiment described herein, controlling the flow of hydraulic fluid may include actuating a plurality of solenoid valves on the multi-function valve.

In any of the embodiment described herein, a method of use may further include receiving, by the control box, one or more user input; and generating, by the control box, the control signal based on the one or more user inputs.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Embodiments of the present disclosure are directed to basket rakes couplable to tractors. Basket rakes in accordance with embodiments of the present disclosure include multi-function valves configured to hydraulically control functions of the basket rakes and improve the functionality of the basket rakes.

In accordance with one embodiment of the present disclosure, FIGS. 1-12 are directed to a basket rake 10 in various different configurations. The basket rake 10 includes a main frame 12, a first (e.g., left) basket 14, and a second (e.g., right) basket 16. The left and right baskets 14 and 16 are coupled to the main frame 12 via extension frame 18 and extension frame 20, respectively. The main frame 12 includes a coupling arm 21 and a hitch 22 that is couplable to a tractor (tractor not shown).

Although discussed as left and right baskets 14 and 16, such directional language is for providing clarity in reference to the drawings and is not intended to be limiting language. Suitable first and second baskets may be configured in other configurations besides left and right, for example, right and left, back and front, front and back, etc.

Figure 1:
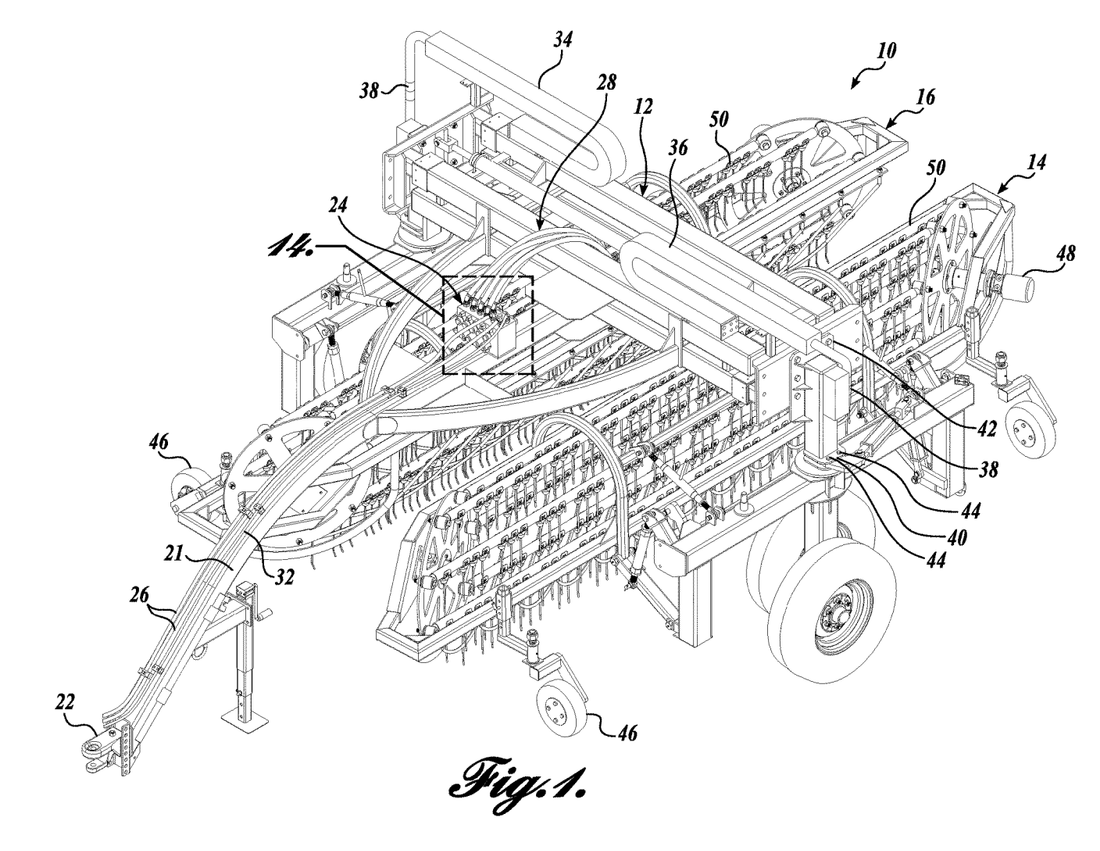
FIG. 1 is an isometric view of one embodiment of a basket rake in a folded configuration, in accordance with the embodiments disclosed herein.
Figure 14:
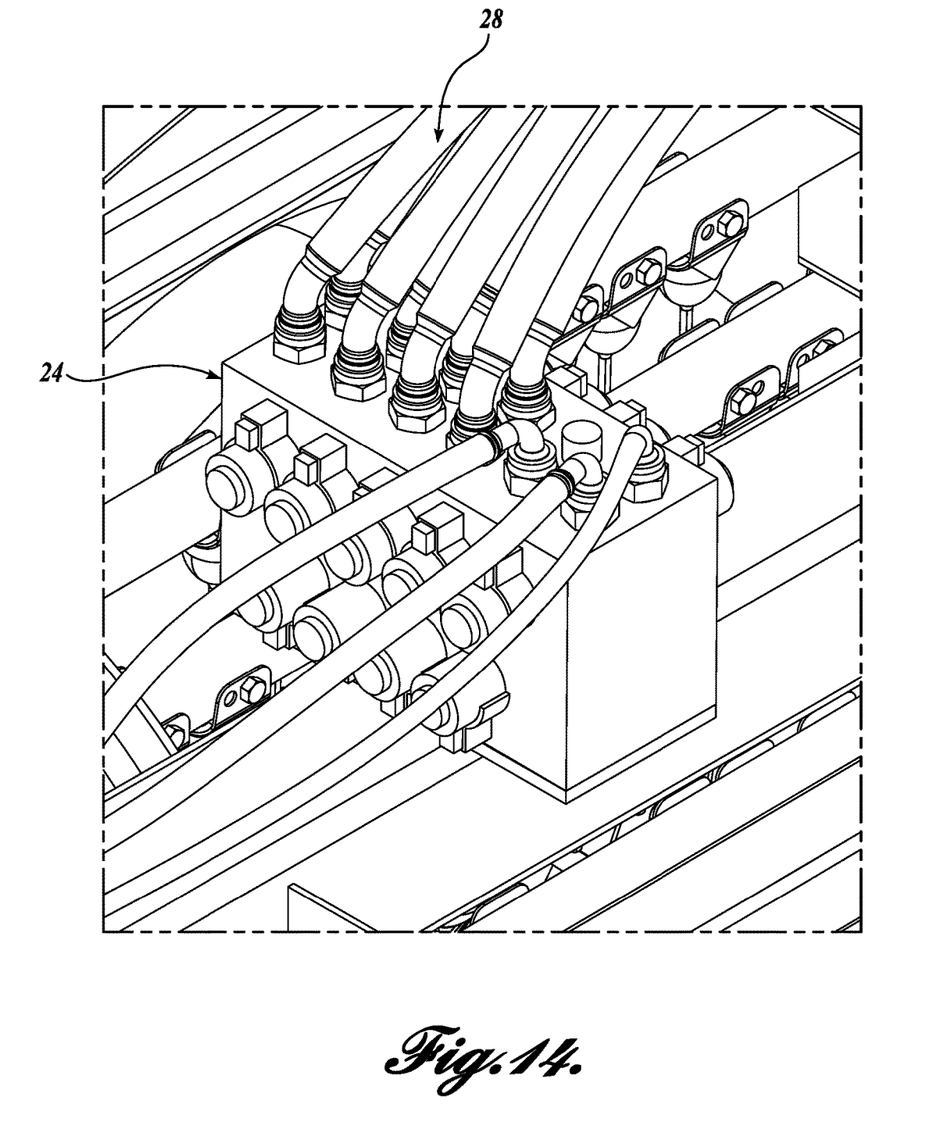
FIG. 14 is a close up view of a multi-function value of the basket rake of FIG. 1.

Referring to FIGS. 1 and 14, the basket rake 10 includes a multi-function valve 24. The multi-function value 24 is configured to hydraulically control functions of the basket rake 10. For example, the multi-function valve 24 is used control functions of the basket rake 10 to position the basket rake in the various different configurations depicted in FIGS. 1-12.

Referring to FIG. 1, the multi-function valve 24 is couplable to input and output hydraulic lines 26 and to basket rake function control lines 28. The input and output hydraulic lines 26 receive and send hydraulic fluid from the tractor hydraulic system (not shown).

The basket rake function control lines 28 are coupled to hydraulic actuators (e.g., hydraulic cylinders, hydraulic motors, etc.) to control various functions of the position and operation of the left basket 14 and the right basket 16.

Figure 2:
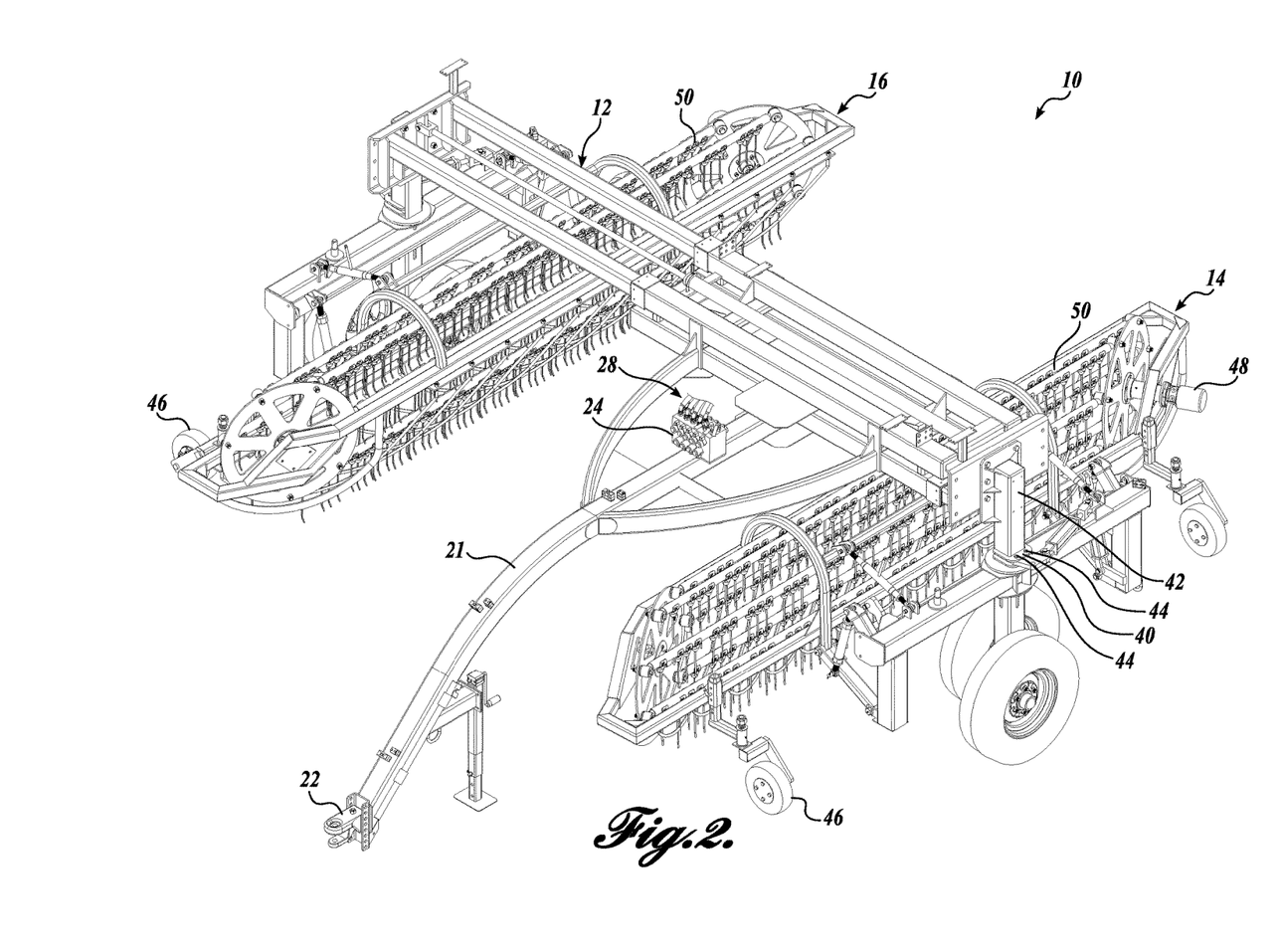
FIG. 2 is an isometric view of the basket rake of FIG. 1 in a left basket extended configuration.
Figure 3:
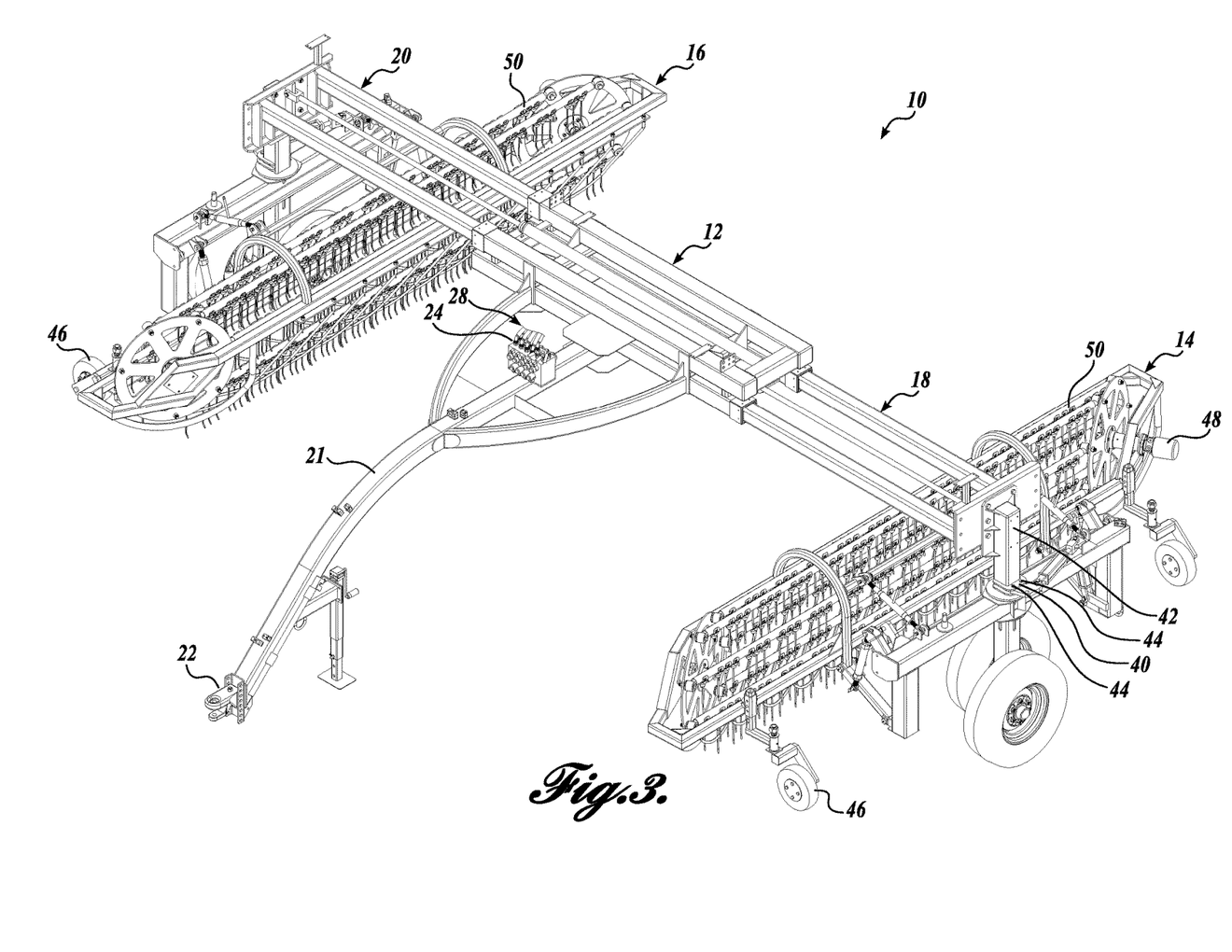
FIG. 3 is an isometric view of the basket rake of FIG. 1 in a right basket a configuration.

In some embodiments of the present disclosure, the multi-function valve 24 controls extension and retraction of the left basket 14 and the right basket 16 with respect to the main frame 12. One or more of the basket rake function control lines 28 are coupled to actuators (e.g., hydraulic cylinders) that control the extension and retraction of the extension frames 18 and 20. The left and right baskets 14 and 16 are coupled to the extension frames 18 and 20 such that extension and retraction of the extension frames 18 and 20 results in extension and retraction of the left and right baskets 14 and 16. An example of extension and retraction of left and right baskets of a basket rake is shown in FIGS. 2 and 3 (isometric views) and FIGS. 8 and 9 (side views).

In some embodiments of the present disclosure, the multi-function valve 24 separately controls hydraulic fluid flow to and from the actuators that control the extension and retraction of the extension frames 18 and 20 such that the extension and retraction of the left and right baskets 14 and 16 are separately controllable.

Figure 4:
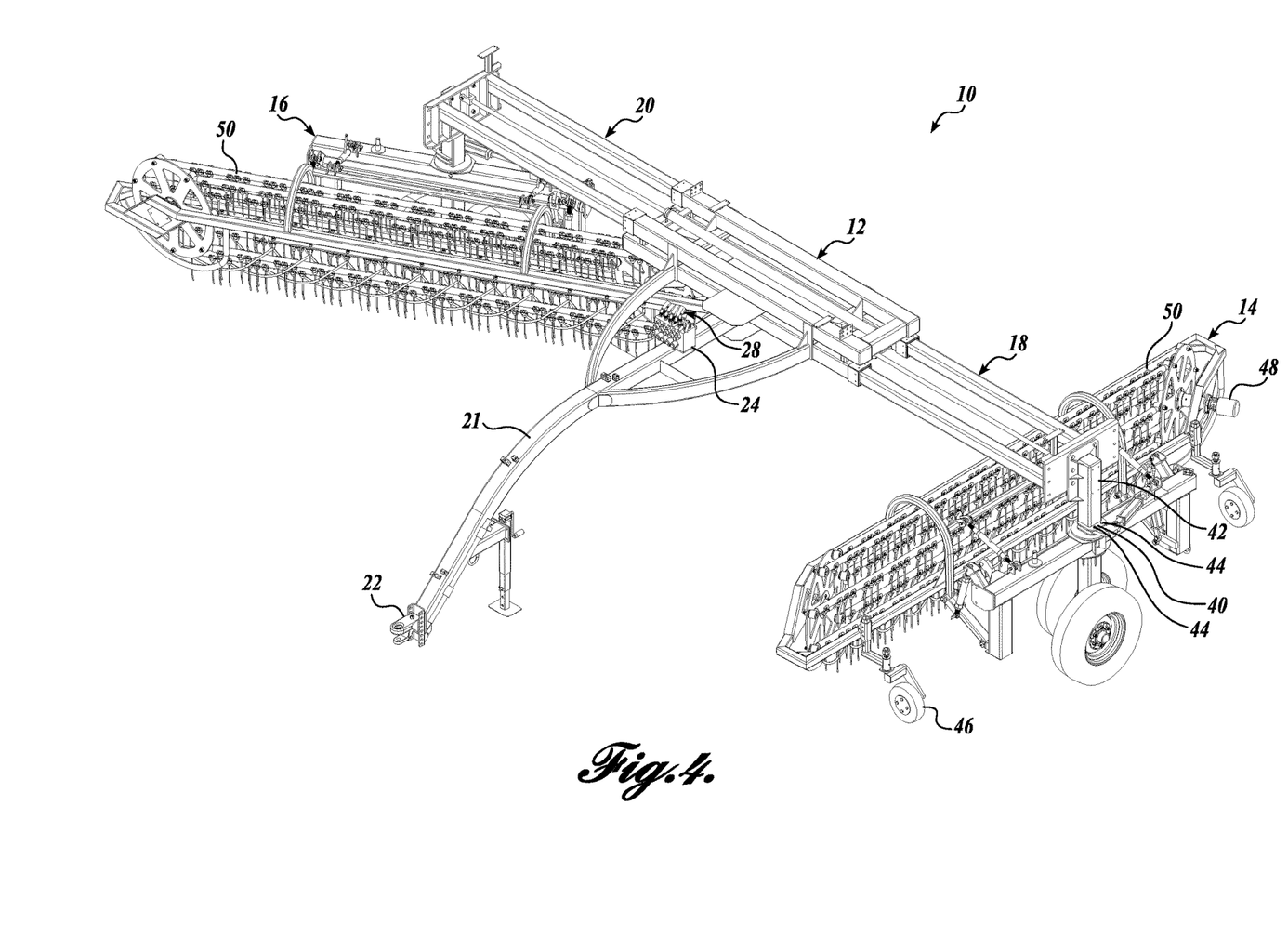
FIG. 4 is an isometric view of the basket rake of FIG. 1 in a left basket angled configuration.
Figure 5:
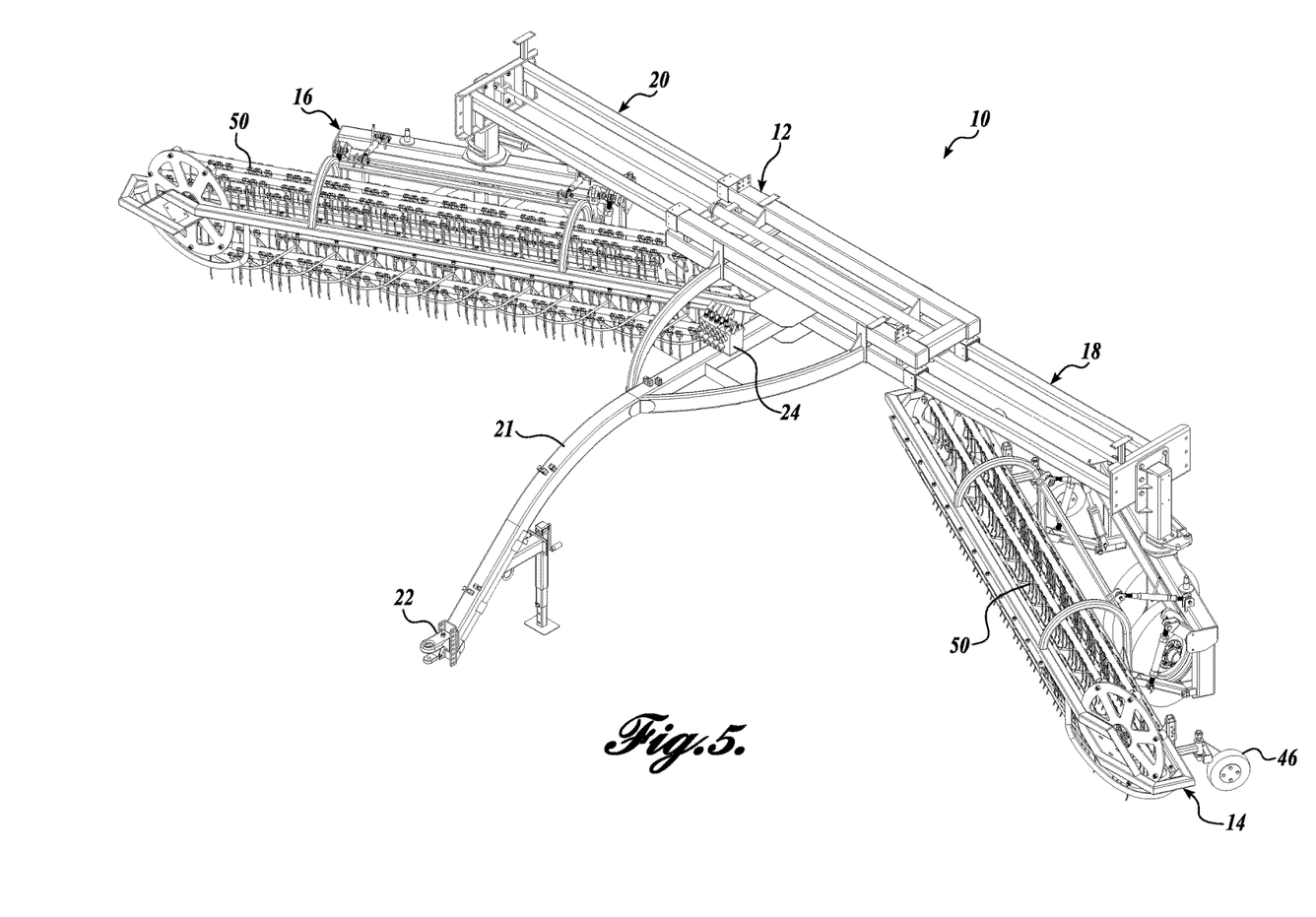
FIG. 5 is an isometric view of the basket rake of FIG. 1 in a right basket angled configuration.

In some embodiments of the present disclosure, the multi-function valve 24 controls angles of the left basket 14 and the right basket 16 with respect to the main frame 12. One or more of the basket rake function control lines 28 are coupled to actuators (e.g., hydraulic motors) that control the angular position of the left and right baskets 14 and 16 with respect to the end of the extension frames 18 and 20. An example of angular rotation of left and right baskets of a basket rake is shown in FIGS. 4 and 5 (isometric views) and FIGS. 10 and 11 (side views).

In some embodiments of the present disclosure, the multi-function valve 24 separately controls hydraulic fluid flow to and from the actuators that control the angular movement of the left and right baskets 14 and 16 such that the angular positions of the left and right baskets 14 and 16 are separately controllable.

Figure 6:
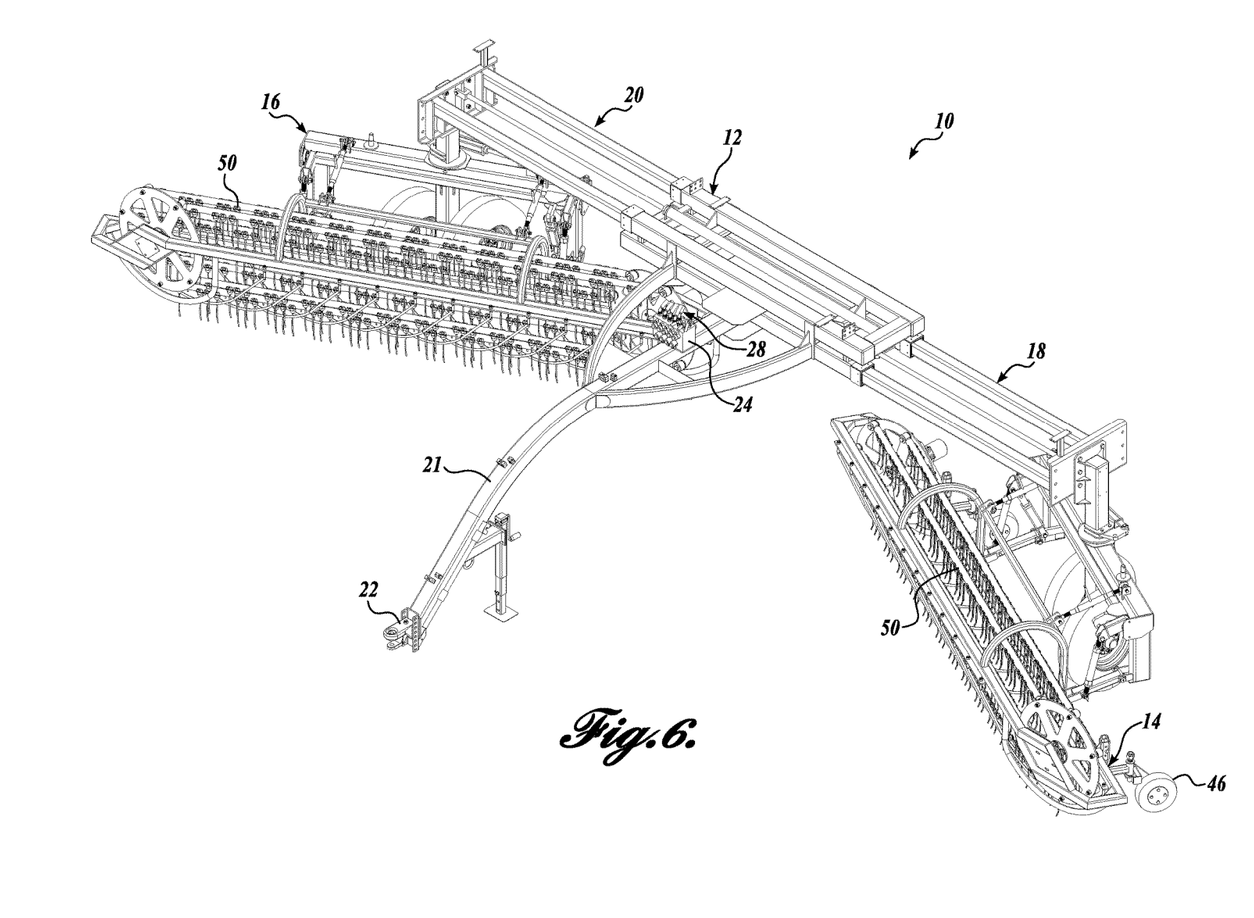
FIG. 6 is an isometric view of the basket rake of FIG. 1 in a basket lowered configuration.
Figure 7:
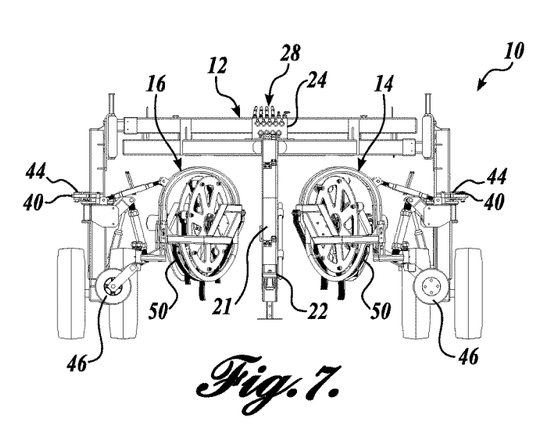
FIG. 7 is a side view of the basket rake of FIG. 1 in a folded configuration, in accordance with the embodiments disclosed herein.
Figure 8:
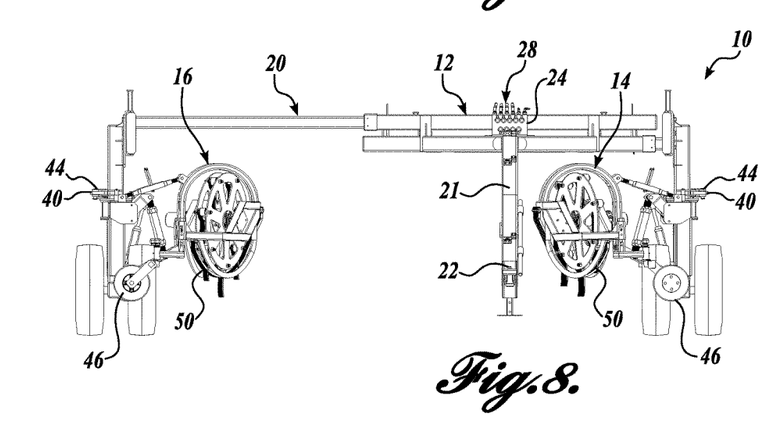
FIG. 8 is a side view of the basket rake of FIG. 1 in a left basket extended configuration.
Figure 9:
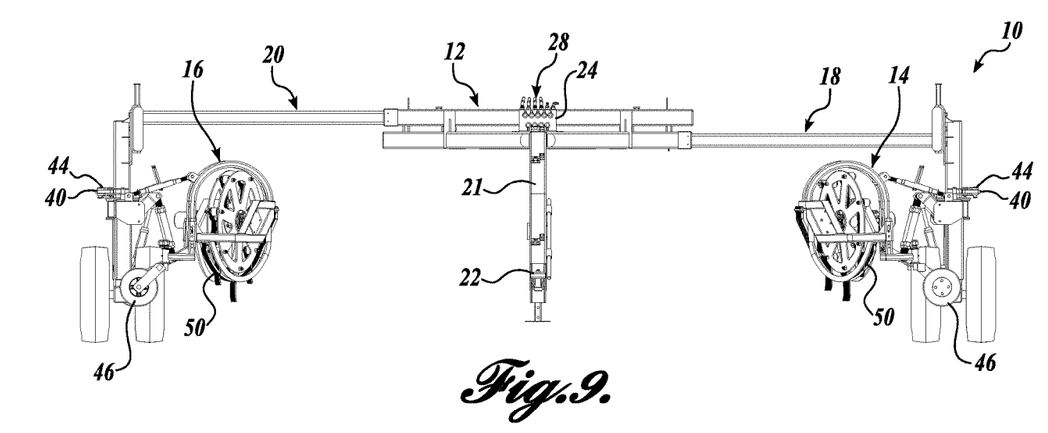
FIG. 9 is a side view of the basket rake of FIG. 1 in a right basket a configuration.
Figure 10:
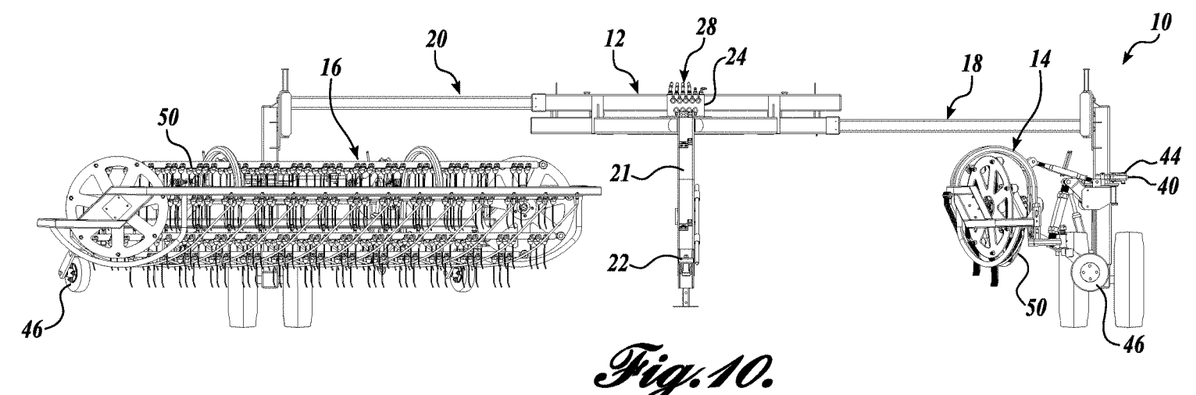
FIG. 10 is a side view of the basket rake of FIG. 1 in a left basket angled configuration.
Figure 11:
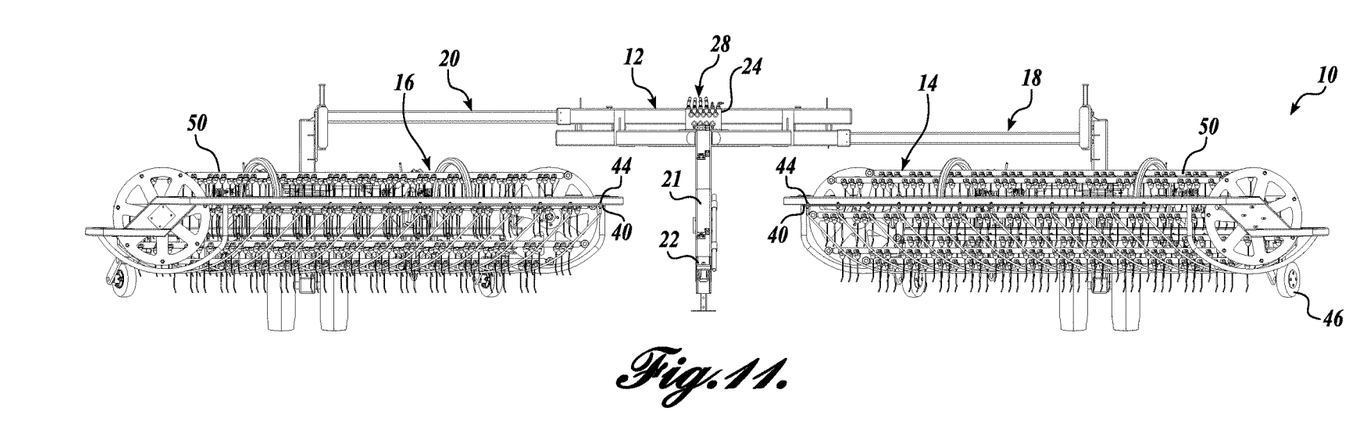
FIG. 11 is a side view of the basket rake of FIG. 1 in a right basket angled configuration.
Figure 12:
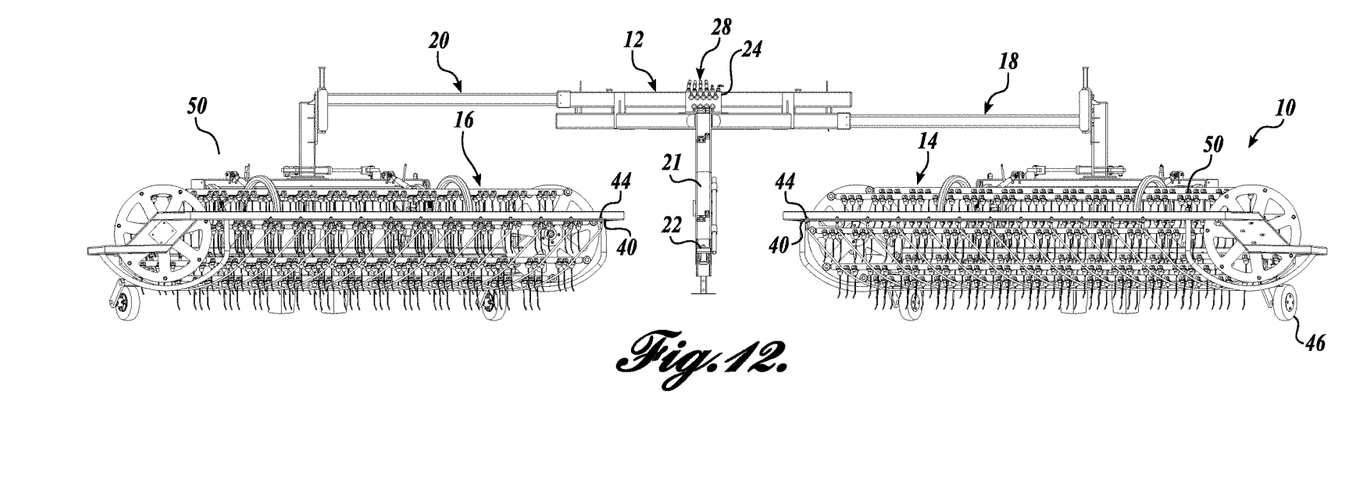
FIG. 12 is a side view of the basket rake of FIG. 1 in a basket lowered configuration.

In some embodiments of the present disclosure, the multi-function valve 24 controls raising and lowering of the left basket 14 and the right basket 16. While the left and right baskets 14 and 16 are typically lowered during a harvesting operation in a raking configuration, it may be desirable to raise the left and right baskets 14 and 16 at other times to avoid damage to the left and right baskets 14 and 16. One or more of the basket rake function control lines 28 are coupled to actuators (e.g., hydraulic cylinders) that control the raising and lowering of the left basket 14 and the right basket 16. An example of lowered baskets for raking baskets is shown in FIG. 6 (isometric view) and FIG. 12 side view, which can be compared with raised baskets in FIG. 5 (isometric view) and FIG. 11 (side view).

In some embodiments of the present disclosure, the multi-function valve 24 separately controls hydraulic fluid flow to and from the actuators that control the raising and lowering of the raising and lowering of the left and right baskets 14 and 16 such that the vertical positions of the left and right baskets 14 and 16 are separately controllable. In some embodiments, the multi-function valve 24 simultaneously controls hydraulic fluid flow to and from the actuators that control the raising and lowering of the raising and lowering of the left and right baskets 14 and 16 such that the vertical positions of the left and right baskets 14 and 16 are moved simultaneously.

Referring to FIG. 1, in some embodiments of the present disclosure, the multi-function valve 24 controls drive motors 48 of the left and right baskets 14 and 16 to control operation of the left and right baskets 14 and 16. Operation of a drive motors 48 causes rake tines 50 of the left and right baskets 14 and 16 to rotate. During harvesting, the rotating rake tines 50 are used to direct hay or other agricultural products through the baskets 14 and 16. While the drive motors 48 of the left and right baskets 14 and 16 are operated during a harvesting operation, it may be desirable to cease operating the drive motors of the left and right baskets 14 and 16 at other times to avoid overuse of the left and right baskets 14 and 16 and danger to operators of the basket rake 10. One or more of the basket rake function control lines 28 are coupled to the drive motors that operate the left and right baskets 14 and 16.

The multi-function valve 24 includes a plurality of valves 30 (e.g., solenoid valves) to control flow of hydraulic fluid received from the input and output hydraulic lines 26 to individual basket rake function control lines 28. Each of the valves 30 is actuatable to start, stop, or adjust flow of hydraulic fluid to one or more of the basket rake function control lines 28. The multi-function valve 24 is couplable to a signal line 32 that carries signals for controlling operation of the valves 30.

In some embodiments of the present disclosure, the signal line 32 is couplable to a control box. An exemplary control box 100 is provided in FIG. 13. The control box 100 sends signals to the multi-function valve 24 in response to user inputs. In this way, user inputs to the control box are translated into signals that actuate the valves 30 to control operation of the various functions of the position and operation of the left and right baskets 14 and 16, as described above.

Figure 13:
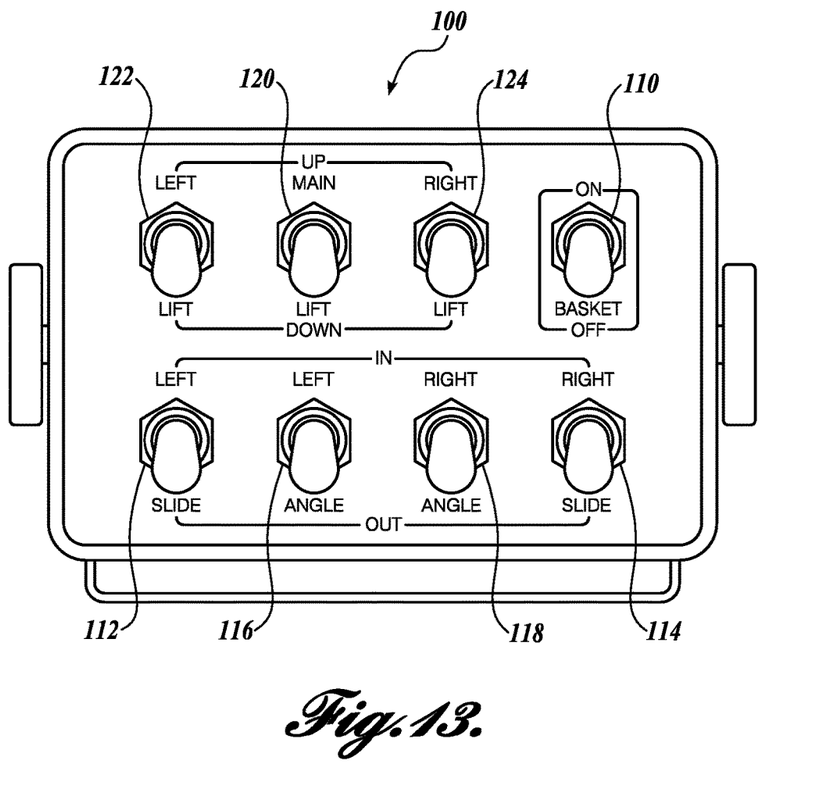
FIG. 13 is a schematic of a control box for operator control of the basket rake of FIG. 1.

In the illustrated embodiment of FIG. 13, the control box 100 includes seven functions and an on/off switch. Although shown as including seven functions, other numbers of functions are within the scope of the present disclosure. The control functions of the illustrated control box 100 includes a basket on/off switch 110, left basket slide (or extend) switch 112, right basket slide (or extend switch 114, left basket angle switch 116, right basket angle switch 118. The control box 100 further includes raising and lowering controls for the basket rake 10, including a main raising and lowering switch 120, a left basket raising and lowering switch 122, and a right basket raising and lowering switch 124. The switches of the control box 100 can be used to control the various functions of the basket rake 10 and also the degrees of extension, angle, lowering of the left and right baskets 14 and 16.

One advantageous effect of a multi-function valve 24 controlled by a single control box 100, as described in the present disclosure, is ease of control for the user of the multiple functions of the basket rake 10. Moreover, the control box 100 can be used for sole control of all functions of the basket rake 10 by sending all signals to the multi-function valve 24. Therefore, all functions of the basket rake 10 may be controlled by using one single control box 100. In some situations it may be desirable to turn off the basket drive motors while continuing to operate the other functions of the basket rake 10. Such a control system allows for this functionality. The advantages of turning off the basket drive motors allows for transport safety (e.g., from field to field), allows for emergency shut off while operating, and reduces wear and tear on the basket components (bearings, tine bars, rake teeth, etc.).

In some embodiments of the present disclosure, the multi-function valve 24 is configured to limit flow of hydraulic fluid to each of the basket rake function control lines 28 within a particular range. In one example, the multi-function valve 24 is configured to receive about 12 gal/min or more of hydraulic fluid from the tractor via the input and output hydraulic lines 26, while the drive motors of the left and right baskets 14 and 16 operate at about 8 gal/min and the other functions of the basket rake 10 (e.g., extension/retraction and angling of left and right baskets 14 and 16) operate in a range of about 4 gal/min and about 6 gal/max.

The multi-function valve 24 limits flow of hydraulic fluid to each of the basket rake function control lines 28 such that the various actuators coupled to the control lines 28 do not receive more flow than a predetermined amount of flow for their associated functions. Any amount of hydraulic fluid flow from the input and output hydraulic lines 26 that is not used by the multi-function valve 24 to feed the control lines 28 is returned to the tractor via the input and output hydraulic lines 26. One advantageous effect of an integrate flow of hydraulic fluid with is that flow control is not needed for the baskets to function. The flow-limiting function of the multi-function valve 24 is useful to adjust for different flow rates provided by different types of tractors and/or varying flow rates provided by a tractor.

Referring to FIG. 1, the basket rake 10 of the present disclosure includes a first hose track 34 and a second hose track 36 for protecting control lines 28 running from the main frame 12 to the left and right baskets 14 and 16, respectively. The hose tracks 34 and 36 reduce the likelihood of damage to the control lines 28 when the extension frames 18 and 20 are extended and retracted. The first and second hose tracks 34 and 36 may also have width markers used as reference aids regarding how far the extension frames 18 and 20 are extended.

Referring to FIG. 1, in some embodiments of the present disclosure, the control lines 28 that extend to actuators on the left and right baskets 14 and 16 include releasable fittings 38 located within a particular distance of the ends of the hose tracks 34 and 36. The releasable fittings 38 allow the portion of the control lines 28 between the releasable fittings 38 and the actuators on the left and right baskets 14 and 16 to be easily removed and replaced as needed without replacing the entire portion of the control lines 28 inside the hose tracks 34 and 36. In some circumstances, the portion of the control lines 28 between the releasable fittings 38 and the actuators on the left and right baskets 14 and 16 are more exposed, and thus more susceptible to damage, than the portion of the control lines 28 inside the hose tracks 34 and 36. In this way, the portions of the control lines 28 that are more susceptible to damage are more easily replaceable than other portions of the control lines 28.

Referring to FIG. 1, in some embodiments of the present disclosure, each of the left and right baskets 14 and 16 is coupled to one of the extension frames 18 and 20 via a double shear angle mount 40. In this example, a vertical bracket 42 is fixedly coupled to the end of the extension frame 18. The right basket 16 is coupled to the vertical bracket 42 via the double shear angle mount 40. The double shear angle mount 40 includes two shear pins 44. The two shear pins 44 are arranged such that, if one of the ends of the right basket 16 sustains an impact that shears one of the two shear pins 44, the other of the two shear pins 44 is not likely to shear. In this way, the right basket 16 will remain coupled to the vertical bracket 42 even if a shear pin fails and the failed shear pin can be replaced while the right basket 16 is still coupled to the vertical bracket.

Referring to FIGS. 5 and 6, in some embodiments of the present disclosure, one or both ends of each of the left and right baskets 14 and 16 includes a gauge wheel 46. When one of the baskets is lowered, a gauge wheel on one or both ends of the lowered basket contacts the ground before other parts of the basket contact the ground. This protects the other parts of the basket from damage that may occur from contacting the ground. In some embodiments, the gauge wheel 46 is a solid rubber wheel. In some embodiments, the gauge wheel 46 is a torsion axle suspension gauge wheel. The torsion axle suspension gauge wheel uses a torsion axle as its main weight bearing spring. The torsion axle is fixedly attached to the right basket 16. Vertical motion of the gauge wheel causes the torsion axle to twist around its axis and the vertical motion is resisted by the torsional resistance of the twisted torsion axle. In general, the torsion axle of the torsion axle suspension gauge wheel is highly durable and permits relative easy adjustability of the height of the gauge wheel 46.

While embodiments of the disclosed subject matter have been illustrated and described, it will be appreciated that various changes can be made therein without departing from the spirit and scope of the disclosure.

The embodiments of the disclosure in which an exclusive property or privilege is claimed are defined as follows:

1. A basket rake comprising:
   a main frame configured to be coupled to a tractor;
   a left basket including a drive motor, the left basket coupled to the main frame via a left extension frame;
   a right basket including a drive motor, the right basket coupled to the main frame via a right extension frame;
   a plurality of hydraulic actuators, the plurality of hydraulic actuators including a first hydraulic actuator configured to extend or retract the left extension frame, a second hydraulic actuator configured to extend or retract the right extension frame, a third hydraulic actuator configured to rotate the left basket, a fourth hydraulic actuator configured to rotate the right basket, a fifth hydraulic actuator configured to raise or lower the left basket, a six hydraulic actuator configured to raise or lower the right basket, and a seventh hydraulic actuator configured to operate the drive motors of both the left and right baskets;
   a plurality of control lines, wherein each of the plurality of control lines is hydraulically coupled to a single one of the plurality of actuators, the plurality of control lines including a first control line corresponding with the first hydraulic actuator, a second control line corresponding with the second hydraulic actuator, a third control line corresponding with the third hydraulic actuator, a fourth control line corresponding with the fourth hydraulic actuator, a fifth control line corresponding with the fifth hydraulic actuator, a sixth control line corresponding with the sixth hydraulic actuator, and a seventh control line corresponding with the seventh hydraulic actuator; and
   a multi-function valve hydraulically coupled to each of the plurality of control lines, wherein the multi-function valve is configured to receive hydraulic fluid from the tractor and further configured to direct hydraulic fluid and control the flow of the hydraulic fluid to one or more of the plurality of hydraulic actuators via the corresponding one or more control lines such that each of the plurality of hydraulic actuators is capable of operating by itself to extend or retract the left extension frame, extend or retract the right extension frame, rotate the left basket, rotate the right basket, raise or lower the left basket, raise or lower the right basket, and operate the drive motors of both the left and right baskets.

2. The basket rake of claim 1, wherein the multi-function valve is configured to limit a flow rate of hydraulic fluid to each of the plurality of control lines based on a predetermined limit for each of the plurality of control lines.

3. The basket rake of claim 1, wherein the multi-function valve includes a plurality of solenoid valves configured to control flow of hydraulic fluid independently to each of the plurality of control lines.

4. The basket rake of claim 3, wherein the multi-function valve is configured to receive a control signal, wherein the plurality of solenoid valves are configured to be actuated based on the control signal.

5. The basket rake of claim 4, wherein the multi-function valve is configured to receive the control signal from a control box configured to receive user inputs.

6. The basket rake of claim 1, further comprising:
   a hose track configured to reduce a likelihood of damage to at least one of the plurality of control lines that extends between the multi-function valve and at least one of the plurality of actuators on the right basket during extension or retraction of the left extension frame.

7. The basket rake of claim 6, wherein the at least one of the plurality of control lines includes a releasable fitting located within a particular distance of an end of the hose track.

8. The basket rake of claim 1, wherein the right basket is coupled to an end of the right extension frame via a double shear angle mount.

9. The basket rake of claim 8, wherein a vertical bracket is fixedly coupled to the end of the right extension frame, and wherein the right basket is coupled to the vertical bracket via the double shear angle mount.

10. The basket rake of claim 1, further comprising:
    at least one gauge wheel located at an end of the right basket.

11. The basket rake of claim 10, wherein the gauge wheel is a torsion axle suspension gauge wheel.

12. A method of operating a basket rake, wherein the basket rake includes a main frame configured to be coupled to a tractor, a left basket coupled to the main frame via a left extension frame, and a right basket coupled to the main frame via a right extension frame, the method comprising:
    receiving, by a multi-function valve, a flow of hydraulic fluid from a tractor;
    receiving, by the multi-function valve, one or more control signals from a control box; and
    controlling, by the multi-function valve based on the one or more control signals, flow of hydraulic fluid independently to each of a plurality of control lines hydraulically coupled between the multi-function valve and one of a plurality of hydraulic actuators on the basket rake, the plurality of hydraulic actuators including a first hydraulic actuator configured to extend or retract the left extension frame, a second hydraulic actuator configured to extend or retract the right extension frame, a third hydraulic actuator configured to rotate the left basket, a fourth hydraulic actuator configured to rotate the right basket, a fifth hydraulic actuator configured to raise or lower the left basket, a six hydraulic actuator configured to raise or lower the right basket, and a seventh hydraulic actuator configured to operate the drive motors of both the left and right baskets, and the plurality of control lines including a first control line corresponding with the first hydraulic actuator, a second control line corresponding with the second hydraulic actuator, a third control line corresponding with the third hydraulic actuator, a fourth control line corresponding with the fourth hydraulic actuator, a fifth control line corresponding with the fifth hydraulic actuator, a sixth control line corresponding with the sixth hydraulic actuator, and a seventh control line corresponding with the seventh hydraulic actuator, such that each of the plurality of hydraulic actuators is capable of operating by itself to extend or retract the left extension frame, extend or retract the right extension frame, rotate the left basket, rotate the right basket, raise or lower the left basket, raise or lower the right basket, and operate drive motors of both the left and right baskets.

13. The method of claim 12, further comprising:
limiting, by the multi-function valve, a flow rate of hydraulic fluid to each of the plurality of control lines based on a predetermined limit for each of the plurality of control lines.

14. The method of claim 12, wherein controlling the flow of hydraulic fluid includes actuating a plurality of solenoid valves on the multi-function valve.

15. The method of claim 12, further comprising:
receiving, by the control box, one or more user input; and
generating, by the control box, the control signal based on the one or more user inputs.

* * * * *